(12) United States Patent
Morgulis

(10) Patent No.: US 7,896,586 B2
(45) Date of Patent: Mar. 1, 2011

(54) INDEXABLE INSERT

(75) Inventor: Rafael Morgulis, Karmiel (IL)

(73) Assignee: Vargus, Ltd., Nahariya (IL)

( * ) Notice: Subject to any disclaimer, the term of this patent is extended or adjusted under 35 U.S.C. 154(b) by 249 days.

(21) Appl. No.: 12/304,215

(22) PCT Filed: Jun. 4, 2007

(86) PCT No.: PCT/IB2007/001516

§ 371 (c)(1),
(2), (4) Date: Jan. 15, 2009

(87) PCT Pub. No.: WO2007/144722

PCT Pub. Date: Dec. 21, 2007

(65) Prior Publication Data

US 2009/0252565 A1   Oct. 8, 2009

(30) Foreign Application Priority Data

Jun. 12, 2006  (DE) ................. 10 2006 028 062

(51) Int. Cl.
*B23B 27/16* (2006.01)
*B23P 15/28* (2006.01)
(52) U.S. Cl. ..................... 407/114; 407/116
(58) Field of Classification Search ........... 407/113, 407/114, 115, 116, 100, 42; 76/101.1
See application file for complete search history.

(56) References Cited

U.S. PATENT DOCUMENTS

| 3,800,379 | A | * | 4/1974 | Hopkins | 407/113 |
| 4,465,412 | A | * | 8/1984 | Zweekly | 407/114 |
| 4,572,713 | A |   | 2/1986 | Schmidt |  |
| 4,575,888 | A | * | 3/1986 | Muren | 470/80 |
| 4,941,780 | A | * | 7/1990 | Takahashi | 407/114 |
| 5,549,424 | A |   | 8/1996 | Bernadic et al. |  |
| 5,549,425 | A |   | 8/1996 | Bernadic et al. |  |
| 5,839,857 | A | * | 11/1998 | Paya | 407/114 |
| 6,138,540 | A | * | 10/2000 | Niemi | 82/1.11 |

(Continued)

FOREIGN PATENT DOCUMENTS

DE        2637757 B2      2/1978

(Continued)

*Primary Examiner*—Will Fridie, Jr.
(74) *Attorney, Agent, or Firm*—Akerman Senterfitt

(57) ABSTRACT

The invention relates to an indexable insert having a first and a second insert surfaces (10*a*, 10*b*), three side faces (11, 12, 13) and a cutting projection (2), wherein the cutting projection (2) comprises at least one first and one second cutting tooth (21, 22), cutting edges (31, 32) are formed on the cutting teeth (21, 22) at a transition region to the first second insert surface (10*a*, 10*b*) respectively, a first chip flow direction (A1) assigned to the first cutting edge (31) forms an angle with a second chip flow direction assigned to the second cutting edge (32), a first and a second chip breaker surface (41, 42) are assigned in the chip flow direction to the first and the second cutting edges (31, 32), respectively, the chip breaker surfaces (41, 42) comprise at least one first and one second groove, respectively, on the first and the second insert surfaces (10*a*, 10*b*) which extend essentially perpendicularly to the respective chip flow direction (A1). The invention also relates to a tool comprising an indexable insert and to a method of producing the same.

16 Claims, 2 Drawing Sheets

U.S. PATENT DOCUMENTS

| | | |
|---|---|---|
| 6,712,563 B2 | 3/2004 | Maier |
| 7,241,083 B2 * | 7/2007 | Nada et al. .................. 407/114 |
| 2005/0214080 A1 * | 9/2005 | Satran ........................ 407/113 |
| 2006/0088391 A1 | 4/2006 | Nada et al. |

FOREIGN PATENT DOCUMENTS

| | | |
|---|---|---|
| EP | 1193010 A1 | 4/2002 |
| JP | 05177415 A | 7/1993 |
| WO | 97/16277 A | 5/1997 |
| WO | 2004/048021 A1 | 6/2004 |

\* cited by examiner

INDEXABLE INSERT

FIELD OF APPLICATION AND PRIOR ART

The invention relates to an indexable insert, as well as to a tool comprising an indexable insert and a method for producing an indexable insert.

Triangular or substantially triangular cutting tips or indexable inserts with three cutting teeth formed in the corner regions are generally known. The inserts can be in the form of indexable inserts, in which case the cutting teeth having two cutting edges each, which are associated with an upper insert face or a lower insert face, respectively. In the chip removal direction chip guide surfaces or chutes can be provided on both sides of the indexable insert for forming a chip. In the case of such an indexable insert in all there can be provided six replaceable cutting edges.

U.S. Pat. No. 4,572,713 discloses a square indexable insert for thread cutting purposes. The square indexable insert comprises two mutually adjacent lateral faces serving as bearing faces, as well as two adjacent side faces facing the bearing faces and on which are formed cutting teeth. The indexable insert has only two cutting edges, which are formed on the cutting teeth on opposing insert faces, so that the cutting edge can be replaced by turning the cutting insert by 180°.

PROBLEM AND SOLUTION

The object of the invention is to provide an indexable insert and a tool comprising an indexable insert, which has a high flexibility and high strength, as well as a method for producing an indexable insert.

This object is solved by the independent claims.

The indexable insert according to the invention comprises a first and a second substantially triangular insert surface, three side faces and at least one cutting projection located in a corner region between a first and a second side face. According to the invention the cutting projection is substantially M-shaped and comprises at least one first and a second cutting tooth and at least on the first cutting tooth is provided a first cutting edge on a transition region to the first insert surface and at least on the second cutting tooth is provided a second cutting edge in a transition region to the second insert surface and an angle is formed by a first chip removal direction or flow direction associated with the first cutting edge and a second chip removal direction associated with the second cutting edge. According to the invention with the first and second cutting edges are in each case associated a first and a second chip guide surface or chip breaker surface in the given chip removal direction, the first chip guide surface having at least one first groove on the first chip face, which extends substantially perpendicular to the first chip removal direction between the first side face and the second side face, and the second chip guide surface has at least one second groove on the second chip face, which extends substantially perpendicular to the second chip removal direction between the first side face and the second side face.

Such an indexable insert is extremely flexible and, as a function of the design, up to six cutting edges can be used by rotating and/or turning over the indexable insert.

The symmetrical M-shaped cutting projection can be produced very easily by using appropriate tools and the indication of certain geometrical data. The cutting edges are formed at the transitions to the first and second insert surface, a chip guide surface being in each case associated with the cutting edges for chip forming purposes. The chip guide surfaces can be made easily and with high precision by shaping grooves running between the side faces. The grooves formed substantially perpendicular to the intersecting chip removal directions are also not parallel and instead intersect one another. This avoids a cross-sectional weakening of the indexable insert.

According to a further development of the invention, the indexable insert is substantially symmetrical with respect to a median associated with the cutting projection, so that through a 180° rotation of said indexable insert about the median the said indexable insert can be imaged on itself. This permits easy manufacture, whilst providing few geometrical data. Moreover, by turning over the indexable insert it can be used without modifications in the setting and/or feed.

In an embodiment of the invention, a tooth root surface of the first cutting tooth located on the first side face and/or a tooth root surface of the second cutting tooth located on the second side face is at least partly located outside the area of the second or first chip guide surface respectively. Thus, the tooth root surface of the first cutting tooth is at least partly in the plane of the insert surface opposing the cutting edge. Consequently, the tooth root surface can be used for supporting the first cutting tooth during the use thereof. This permits a support in the vicinity of the cutting edge. This also applies to the second cutting tooth. Therefore the cutting teeth of the indexable insert can be particularly well supported in use.

In a further embodiment of the invention, the cutting tooth are so positioned that a chip removal direction of the first cutting tooth is substantially parallel to the second side face and a chip removal direction of the second cutting tooth is substantially parallel to the first side face, which leads to particularly simple production thereof.

In a further embodiment of the invention, the first chip guide surface extends substantially perpendicular to the second side face and/or the second chip guide surface extends substantially perpendicular to the first side face. In this case as a result of a suitable setting a particularly advantageous production of the indexable insert is possible.

In a further embodiment, the crests of the first or second cutting teeth respectively are located substantially in a plane of the first or second side face respectively of the cutting projection. This leads to a good supporting of the indexable insert on a tool or a supporting plate during cutting. The indexable insert can be placed on a tool holder in such a way that only the cutting tooth in use does not rest thereon.

In a further embodiment of the invention the first and second side faces have at least one abutment surface for a tool holder each. The abutment surfaces permit a good holding effect in the vicinity of the cutting edge. Through the use of the side face as an abutment surface a space and/or material-saving design is possible.

In yet another embodiment, at least one chip guide surface has a bevelled guide surface and a concave guide surface adjoining to the cutting edge in the chip removal direction. A good chip forming is made possible through such a chip guide surface. An angle with respect to the horizontal and/or insert surface of the bevel chip surface is in one embodiment between 5 and 70°, particularly between 10 and 30°. As a result of suitable chip guide surfaces a chip arising during the cutting of a workpiece is discharged unbroken, elongated and in the form of numerous continuous spirals.

In another embodiment of the invention between at least one cutting tooth and the associated side face is provided a secondary cutting tooth, which can improve the cutting quality.

In an advantageous embodiment the cutting edges are in the form of groove profile cutting edges, particularly thread profile cutting edges for thread production by turning or milling.

The object of the invention is also solved by a tool comprising a tool holder and an aforementioned indexable insert, wherein by indexing said indexable insert a variation is possible between a use of the first cutting tooth in a use position and a use of the second cutting tooth in a use position. In an advantageous embodiment it is possible to change between six use positions of the indexable insert by revolving and indexing the indexable insert.

In an embodiment of the invention, the insert surface facing the cutting edge is at least partly located in a tooth root surface of the cutting tooth in the use position on the tool holder and/or an anvil. This permits a good holding of the cutting tooth used by support close to the cutting edge.

In a further embodiment of the invention, the tool comprises a substantially triangular anvil, a corner of the anvil associated with the cutting tooth in the use position being flattened. The supporting plate permits a good holding effect of the inventive indexable insert.

The object is also solved by a method of production of an indexable insert with a first and a second substantially triangular insert surface and three side faces, wherein at least one corner region between the first and second side faces is formed a cutting projection, which comprises a first cutting edge located in a transition region to the first insert surface and a second cutting edge located in a transition region to the insert surface. According to the invention the cutting projection is formed substantially M-shaped with at least one first and a second cutting tooth and at least on the first cutting tooth a first cutting edge in a transition region to the first insert surface and at least on the second cutting tooth a second cutting edge in a transition region to the second insert surface are provided, wherein a first chip removal direction associated with the first cutting edge forming an angle with a second chip removal direction associated with the second cutting edge and a first and a second chip guide surface in the chip removal direction are respectively associated with the first and second cutting edges. The first chip guide surface has at least one first groove on the first insert surface, which extends substantially perpendicular to the first chip removal direction between the first side face and the second side face and the second chip guide surface has at least one second groove on the second insert surface extending substantially perpendicular to the second chip removal direction between the first side face and the second side face.

The aforementioned and further features can be understood from the claims, description and drawings and the individual features, both alone and in the form of subcombinations, can be implemented in an embodiment of the invention and in other fields and can represent advantageous, independently protectable constructions for which protection is claimed here. The subdivision of the application into individual sections and the subheadings in no way restrict the general validity of the statements made thereunder.

BRIEF DESCRIPTION OF THE DRAWINGS

An embodiment of the invention is described in greater detail hereinafter relative to the drawings, wherein show.

DESCRIPTION OF EMBODIMENTS

Figure 1:
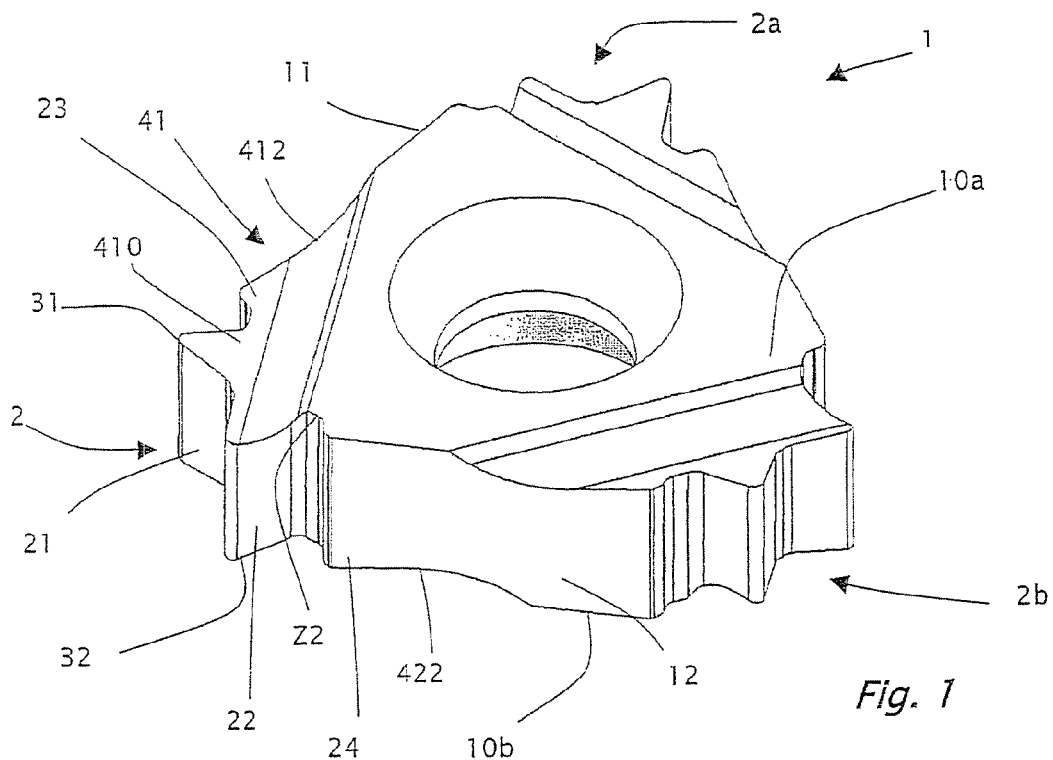
FIG. 1 A perspective view of an indexable insert according to the invention.
Figure 2:
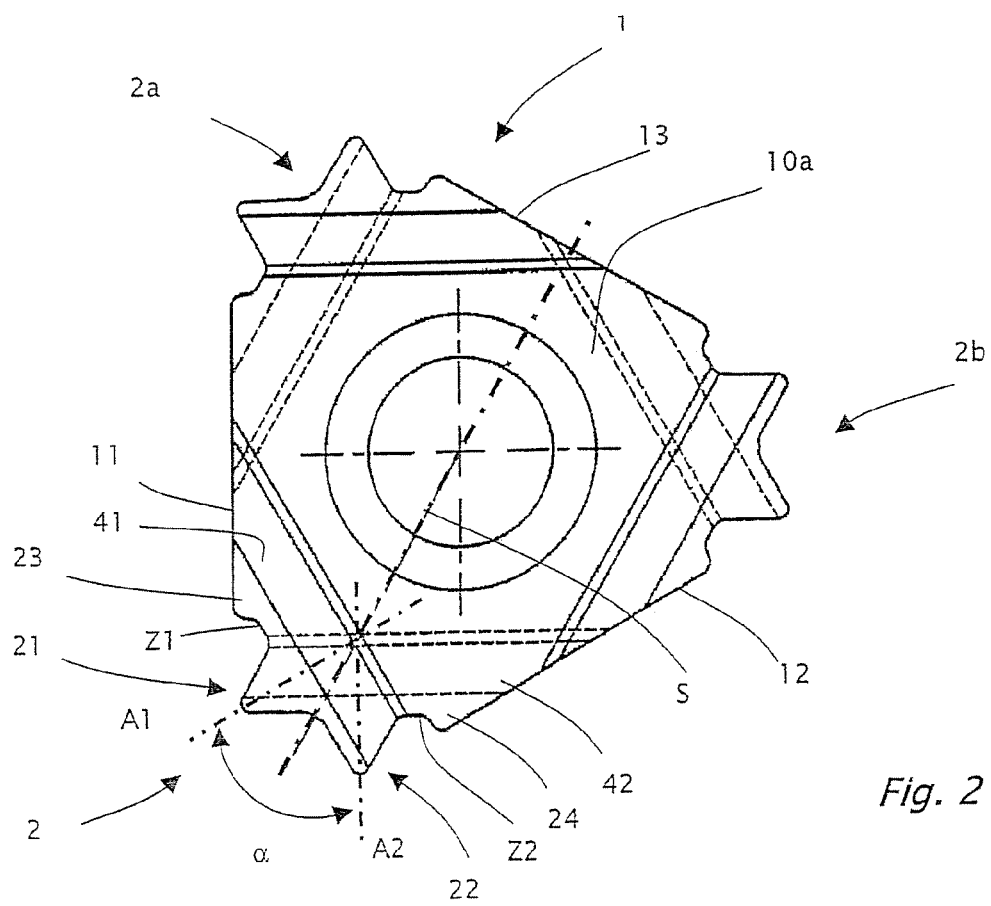
FIG. 2 A top view of the indexable insert according to FIG. 1.

FIGS. 1 and 2 show schematically a perspective view and a top view of a cutting tip or indexable insert 1. It is an insert with a profile cutter, particularly a thread forming tool by turning or milling. The indexable insert 1 comprises a first, substantially triangular insert surface 10a and a second, substantially triangular insert surface 10b buried in FIGS. 1 and 2. The indexable insert 1 also comprises three side faces 11, 12, 13 and, between the latter, M-shaped cutting projections 2, 2a, 2b. Each of the cutting projections 2, 2a, 2b comprises a first cutting tooth 21 and a second cutting tooth 22, which are positioned substantially symmetrically with respect to a not shown surface spanned along a median S associated with the given cutting projection 2 and perpendicular to the insert surface 10a, 10b. In the embodiment shown there is provided a secondary cutting tooth 23, 24 between the cutting teeth 21, 22 and the associated side faces 11, 12.

A first cutting edge 31 is formed on the first cutting tooth 21 in the transition region to the first insert surface 10a. On the second cutting tooth 32 a second cutting edge 32 is formed in the transition region to the second insert surface 10b. In the embodiment shown, the secondary cutting teeth 23, 24 are also comprised by the cutting edges 31, 32.

When the indexable insert 1 is in use, a chip of a not shown workpiece, following its detachment by the first cutting tooth 21, is removed in a chip removal direction A1. Following detachment by the second cutting tooth 22 a chip is removed in a chip removal direction A2 along the buried insert surface 10b. The chip removal directions A1 and A2 intersect with an angle $\alpha$ on the side median. In other, not shown embodiments the cutting teeth are positioned in a different manner, but the chip removal directions also form an angle with one another. In the embodiment shown the cutting teeth 21, 22 are so positioned that the chip removal direction A1 of the first cutting tooth 21 is substantially parallel to the second side face 12. The chip removal direction A2 of the second cutting tooth 22 is substantially parallel to the first side face 11.

With the cutting edges 31, 32 are associated chip guide surfaces or chutes 41, 42 in the given chip removal direction A1, A2 and as a result of which chips of a not shown workpiece are appropriately shaped. The chip guide surfaces 41, 42 are shaped as grooves on the first or second chip face 10a, 10b respectively. In the embodiment shown the first chip guide surface 41 extends substantially perpendicular to the second side face 12. The second chip guide surface 42, buried in FIGS. 1 and 2 and represented by broken lines in FIG. 2, extends substantially perpendicular to the first side face 11. The chip guide surfaces 41, 42 can be easily produced in the form of grooves. As the chip guide surfaces 41, 42 are not parallel, the indexable insert 1 is not weakened in a cross-section on both insert surfaces 10a, 10b. In the embodiment shown, the chip guide surfaces 41, 42 comprise a bevelled guide surface 410 adjoining to the cutting edges 31, 32 in the chip removal direction, as well as a following, concave guide surface 412, 422. As a result of a chip guide surface 41, 42 in this form a particularly good chip forming action is possible.

As can be understood from FIGS. 1 and 2, the chip guide surfaces 41, 42 are directed in such a way that a tooth root surface Z1 of the first cutting tooth 21 is located at least partly outside the second chip guide surface 42 and a tooth root surface Z2 of the second cutting tooth 22 is at least partly located outside the first chip guide surface 41. Tooth root surface Z1 and tooth root surface Z2 are consequently at least partly located in a plane of the second or first insert surface 10a, 10b respectively. Thus, the cutting teeth 21, 22 can be supported on a planar support at least partly in tooth root surface Z1, Z2.

The crests of the first and second cutting teeth 21, 22 in the embodiment shown are substantially in a plane of the first or second side face 11, 12 respectively of cutting projection 2, so that the crests of cutting teeth not in use are protected.

The indexable insert 1 shown is substantially equilateral triangular, the side faces 11, 12, 13 being substantially planar. In other embodiments the side faces can have convex or concave portions. The side faces 11, 12, 13 can in each case serve as a bearing surface for a tool holder shown in FIG. 3.

Figure 3:
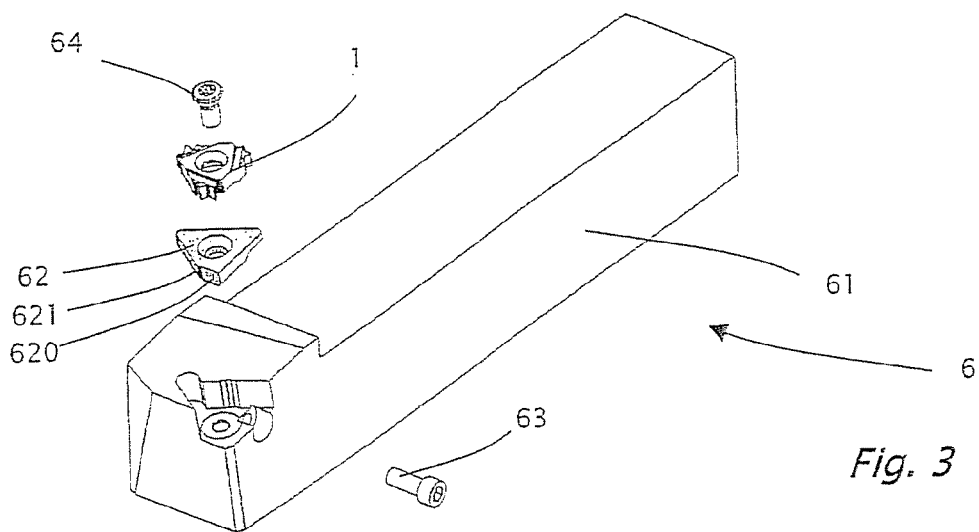
FIG. 3 An exploded view of a tool comprising an indexable insert according to FIG. 1.
Figure 4:
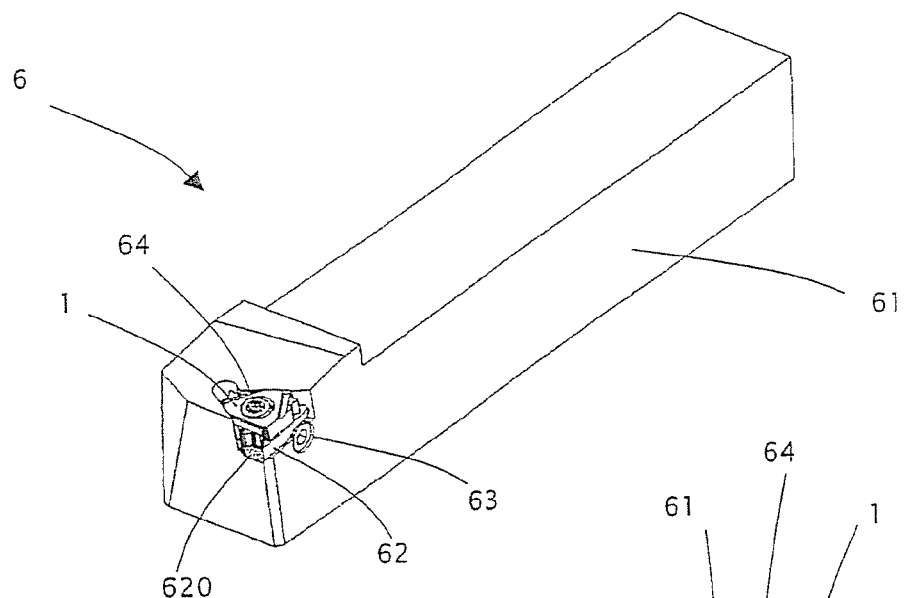
FIG. 4 A perspective view of the tool according to FIG. 3.
Figure 5:
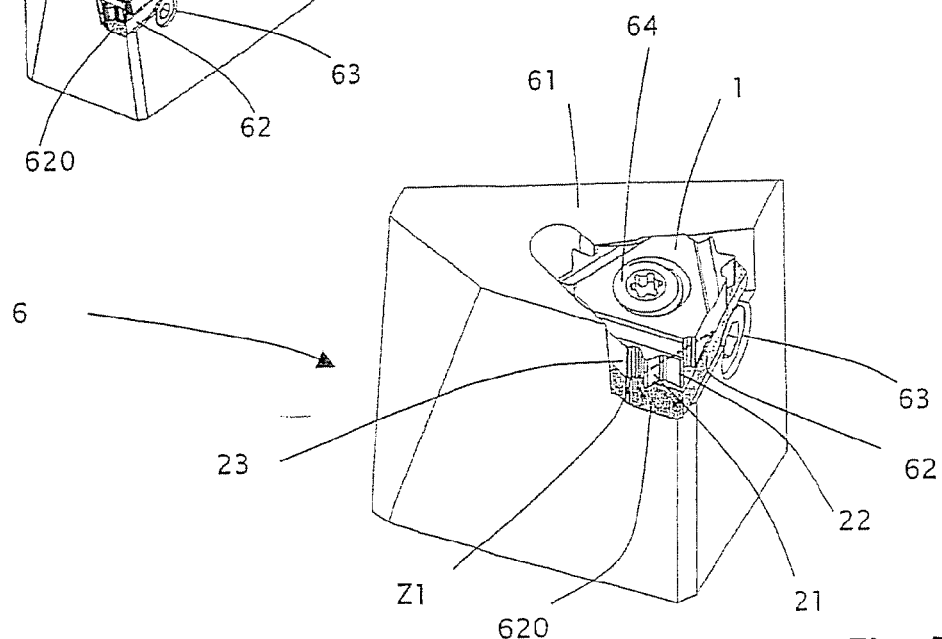
FIG. 5 A detail of the tool according to FIG. 4.

FIGS. 3, 4 and 5 are schematic exploded views, an assembly view and a detail of a tool 6, comprising the indexable insert 1 shown in FIGS. 1 and 2, as well as a tool holder 61, an anvil 62 and locking screws 63, 64. The indexable insert 1 is fixed to the tool holder 61 by means of anvil 62 and locking screws 64. Fixing takes place in a conventional manner and, as shown, the screw 64 can be received eccentrically.

As can best be understood from FIG. 5, the indexable insert 1 abuts with the side faces 11, 13 to the tool holder 61. The anvil 62 is substantially triangular, a corner region 620 of supporting plate 62 being flattened. The indexable insert 1 is mounted on the anvil 62 in such a way that the cutting tooth 21 intended for use projects over the anvil 62.

A rear or trailing edge of the buried second chip guide surface 42 according to FIGS. 1 and 2 formed on the second tip face 10b is indicated by a dot-dash line in FIG. 5. As is apparent from the latter the path of the chip guide surface 42 makes it possible for the cutting tooth 21 to rest on anvil 62 with a tooth root surface Z1, which ensures that the tooth 21 is well supported in use.

By a tooth root surface the second cutting tooth, which is not in use in the embodiment shown, as well as other, not used cutting teeth are located entirely in the region of anvil 62. Cutting tooth 22 and the further cutting teeth are consequently easily protectable against damage.

In the flattened corner region 620, the anvil 62 has a projection 621 visible in FIG. 3 and on which in the embodiment shown is supported a secondary cutting tooth 23.

As can be understood from FIGS. 3 to 5, the indexable insert 1 can be brought into six different orientations on the tool holder 61 by revolving and/or indexing and in each orientation a different cutting tooth is used.

The invention claimed is:

1. An indexable insert comprising:
 a first and a second substantially triangular insert surface; three side faces; and
 at least one cutting projection located in a corner region between the first and second side faces,
 wherein the cutting projection is substantially M-shaped and comprises a first and a second cutting tooth,
 wherein a first cutting edge is provided on at least the first cutting tooth in a transition region to the first tip face,
 wherein a second cutting edge is provided on at least the second cutting tooth in a transition region to the second tip face,
 wherein a first chip removal direction associated with the first cutting edge forms an angle with a second chip removal direction associated with the second cutting edge, and
 wherein the first and second cutting edges are respectively associated with a first and a second chip guide surface in the chip removal direction, the first chip guide surface having at least one first groove on the first insert surface extending substantially perpendicular to the first chip removal direction between the first side face and the second side face, and the second chip guide surface having at least one second groove on the second insert surface extending substantially perpendicular to the second chip removal direction between the first side face and the second side face.

2. The indexable insert according to claim 1, wherein the indexable insert is substantially symmetrical with respect to a median associated with cutting projection, so that by a 180° rotation of the indexable insert about median said indexable insert can be imaged on itself.

3. The indexable insert according to claim 1, wherein a tooth root surface of the first cutting tooth located on the first side face and/or a tooth root surface of the second cutting tooth located on the second side face is at least partly located outside the area of the second or first chip guide surfaces, respectively.

4. The indexable insert according to claim 1, wherein the cutting teeth are so positioned that a chip removal direction of the first cutting tooth is substantially parallel to the second side face and a chip removal direction of the second cutting tooth is substantially parallel to the first side face.

5. The indexable insert according to claim 4, wherein the first chip guide surface extends substantially perpendicular to the second side face and/or the second chip guide surface extends substantially perpendicular to the first side face.

6. The indexable insert according to claim 1 wherein crests of the first and/or second cutting teeth are substantially located in a plane of the first or second side faces, respectively, of the cutting projection.

7. The indexable insert according to claim 1 wherein the first and second lateral faces in each case have at least one abutment surface for a tool holder.

8. The indexable insert according to claim 1, wherein the chip guide surface comprises at least one bevelled guide surface and a concave guide surface adjoining on to the cutting edge in the chip removal direction.

9. The indexable insert according to claim 1, wherein a secondary cutting tooth is formed between at least one cutting tooth and the associated side face.

10. The indexable insert according to claim 1, wherein the cutting edges are in the form of groove profile cutting edges, for producing threads by turning or milling.

11. The indexable insert according to claim 1, wherein a cutting edge is provided on a side of the first or the second cutting tooth and a second cutting edge is provided on the other side of the same cutting tooth.

12. A tool comprising a tool holder and an indexable insert according to claim 1, wherein a variation between a use of the first cutting tooth in a use position and a use of the second cutting tooth in a use position is possible by indexing the indexable insert.

13. The tool according to claim 12, wherein the insert surface of the indexable insert facing the cutting edge rests at least partly in a tooth root surface of a cutting tooth in the use position on a tool holder and/or an anvil.

14. The tool according to claim 12, comprising a substantially triangular anvil, a corner of the anvil associated with the cutting tooth in the use position being flattened.

15. A method of production of an indexable insert with a first and a second substantially triangular insert surface and three side faces a cutting projection being formed in at least one corner region between a first and a second lateral face and comprising a first cutting edge in a transition region to the first tip face and a second cutting edge in a transition region to the second tip face, the method comprising the steps of:

forming the cutting projection to be substantially M-shaped with at least one first and a second cutting tooth;

forming, at least on the first cutting tooth, a first cutting edge in a transition region to the first insert surface;

forming, at least on the second cutting tooth, a second cutting edge in a transition region to the second insert surface, wherein a first chip removal direction associated with the first cutting edge encloses an angle with a second chip removal direction associated with the second cutting edge, and wherein the first and second cutting edges are respectively associated with a first and a second chip guide surface located in the chip removal direction, the first chip guide surface being formed with at least one first groove on the first insert surface extending substantially perpendicular to the first chip removal direction between the first side face and the second lateral face and the second chip guide surface is formed with at least one second groove on the second insert surface extending substantially perpendicular to the second chip removal direction between the first side face and the second side face.

16. The indexable insert according to claim 10, wherein the groove profile cutting edges are in the form of thread profile cutting edges.

* * * * *